United States Patent [19]

Shimada et al.

[11] 4,373,797
[45] Feb. 15, 1983

[54] ELECTROMAGNETICALLY DRIVEN SHUTTER

[75] Inventors: Fumio Shimada, Kawasaki; Yoji Sugiura, Yokohama, both of Japan

[73] Assignees: Canon Kabushiki Kaisha, Tokyo; Canon Denshi Kabushiki Kaisha, Saitama, both of Japan

[21] Appl. No.: 308,564

[22] Filed: Oct. 5, 1981

[30] Foreign Application Priority Data

Oct. 8, 1980 [JP] Japan .............................. 55-143814[U]

[51] Int. Cl.³ .......................... G03B 9/08; G03B 9/40
[52] U.S. Cl. ................................... 354/234; 354/246
[58] Field of Search ............... 354/234, 235, 245, 246, 354/247, 248, 249

[56] References Cited

U.S. PATENT DOCUMENTS

| | | | |
|---|---|---|---|
| 4,225,221 | 9/1980 | Saito et al. | 354/234 |
| 4,231,650 | 11/1980 | Saito et al. | 354/246 |
| 4,306,797 | 12/1981 | Sugiura et al. | 354/234 |

*Primary Examiner*—L. T. Hix
*Assistant Examiner*—Alan Mathews
*Attorney, Agent, or Firm*—Toren, McGeady and Stanger

[57] ABSTRACT

An electromagnetically driven shutter, wherein between the electromagnetic driving source and the shutter blade actuating member which receives the driving force from the driving source a play is provided in such a manner that after the electromagnetic driving source has run a certain determined distance the driving force is transmitted to the shutter blade actuating member so as to let the shutter blade start to run.

5 Claims, 6 Drawing Figures

ELECTROMAGNETICALLY DRIVEN SHUTTER

BACKGROUND OF THE INVENTION

1. Field of the Invention

The present invention relates to an improvement in an electromagnetically driven shutter.

2. Description of the Prior Art

Until now various kinds of so called electromagnetically driven shutters which are driven by means of the electromagnetic force have been proposed. When such shutters are built in compact cameras, it is impossible to provide a large electromagnetic driven shutter because of the restriction of space, and since a comparatively small battery has to be used a large current can not be provided. Consequently a sufficient driving force can not be obtained so that the running speed of the shutter, particularly during commencement of the running operation is inferior. In this connection it has been attempted to raise the density of the magnetic flux at the start position of the shutter, but this problem has not yet been solved completely and the electromagnetically driven shutter has not yet been brought into practice.

SUMMARY OF THE INVENTION

It is an object of the present invention to obtain an electromagnetically driven shutter with superior characteristics during commencement of the shutter running wherein the electromagnetic driving source is permitted to run a certain determined distance with no load after having started operation so as to permit the shutter start to run by making use of the moment of inertia.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENT

Figure 1:
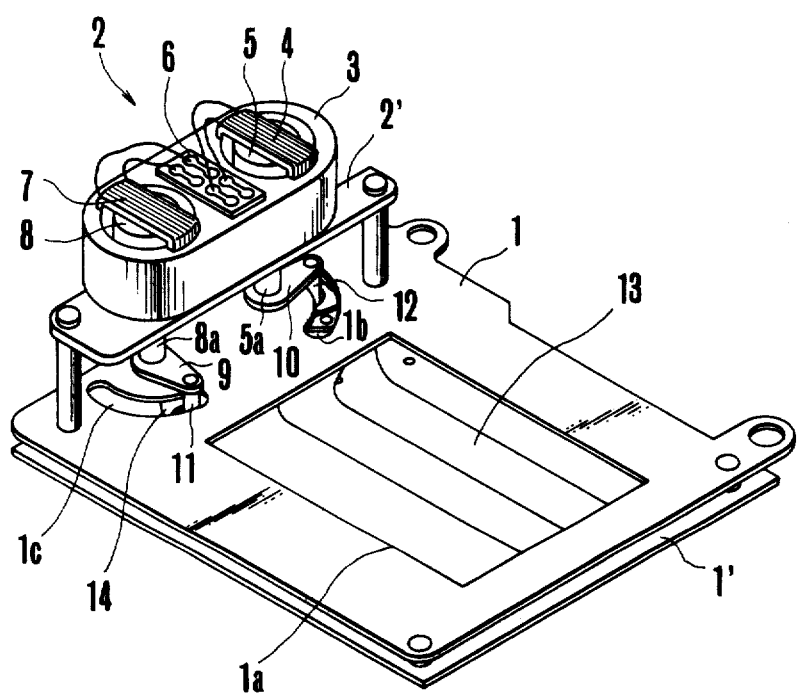
FIGS. 1 and 2 are, respectively, a perspective view and a plan view showing a first embodiment of the invention.
Figure 2:
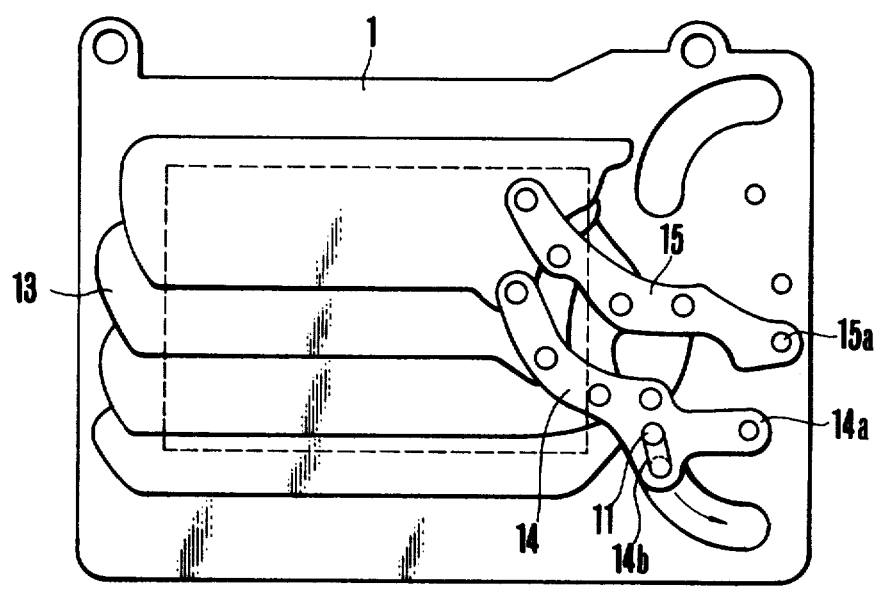

The invention will be described as applied to a metal blade focal plane shutter vertically running by means of a rotating electromagnetic driving source. Referring now to FIGS. 1 and 2, a shutter base plate 1 having an exposure opening 1a, with a leading shutter blade and a trailing shutter blade each consisting of a plurality of blade elements held so as to open and close the exposure opening 1a. A cover base plate 1' is fixed at a certain determined distance from the base plate 1. An electromagnetic driving source fixed on a plate 2' mounted on the shutter base plate through posts. A coil 4 is fixed on a yoke 3, and a magnet 5 is arranged so as to be rotatable within the coil, whereby a pin 12 provided on the arm 10 secured on the lower part of a rotation shaft 5a is connected to the trailing shutter blade actuating arm and extends through an elongated slot 1b in the base plate 1. A coil 7 is provided for the leading shutter blade together with a magnet 8, having a rotation shaft 8a connected to the leading shutter blade actuating arm 14 through an arm 9 and a pin 11.

In FIG. 2, there is shown a leading shutter blade 13 and a leading shutter blade actuating arm 14, which is supported on the base plate 1 so as to be rotatable around a shaft 14a provided concentrically with the rotation shaft 8a of the magnet.

An auxiliary arm 15 is supported on the base plate 1 by means of a shaft 15a, whereby the two arms 14 and 15 support the leading shutter blade elements by means of rivets so as to be rotatable in such a manner that along with the rotation of the arm 14 the shutter blades elements are moved parallel to each other so as to open and close the opening. Although not shown in the drawing, the trailing shutter blade is constructed in the same way. The drawing shows the state before the shutter release. The shutter blade actuating arm 14 is provided with an elongated slot 14b in which the pin 11 of the electromagnetic driving source is inserted so as to be in contact with one end before the shutter release.

When in the above-mentioned state current is supplied to the coil for the leading shutter blade through a lag plate 6 from the shutter control circuit not shown in the drawing, the leading shutter blade driving magnet 8 starts to rotate, whereby although the driving pin 11 runs in the slot 14b along the direction of the arrow in FIG. 2, no motion is transmitted to the arm 14 so that during this period the magnet 8 rotates almost with no load at a rapidly increasing speed. When the pin 11 reaches the position shown in dotted line, it is engaged with the other end of the elongated slot 14b, rotating the arm 14 with the proper driving power and the moment of inertia obtained during the prior motion so as to drive the shutter blade up to the determined position.

Figure 3:
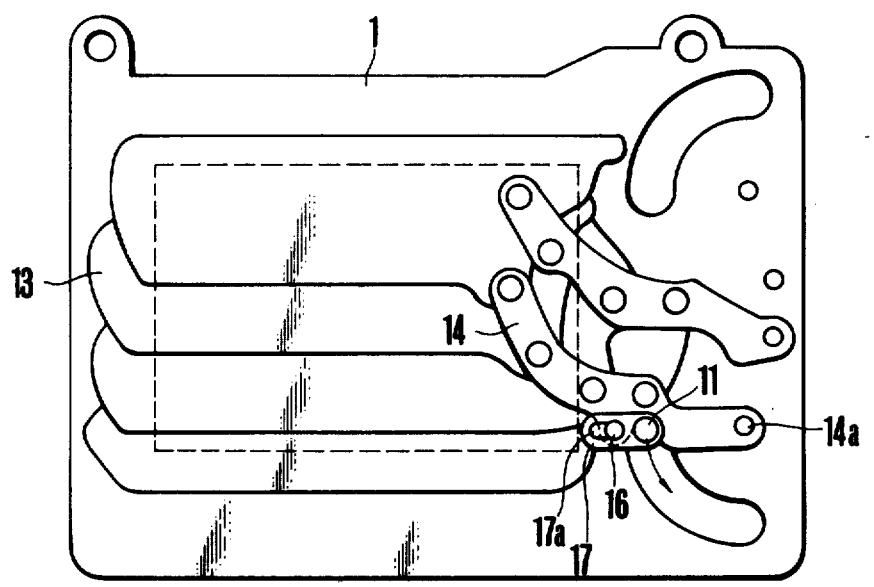
FIGS. 3 and 4 are plan views of a second embodiment shown in different operating positions.
Figure 4:
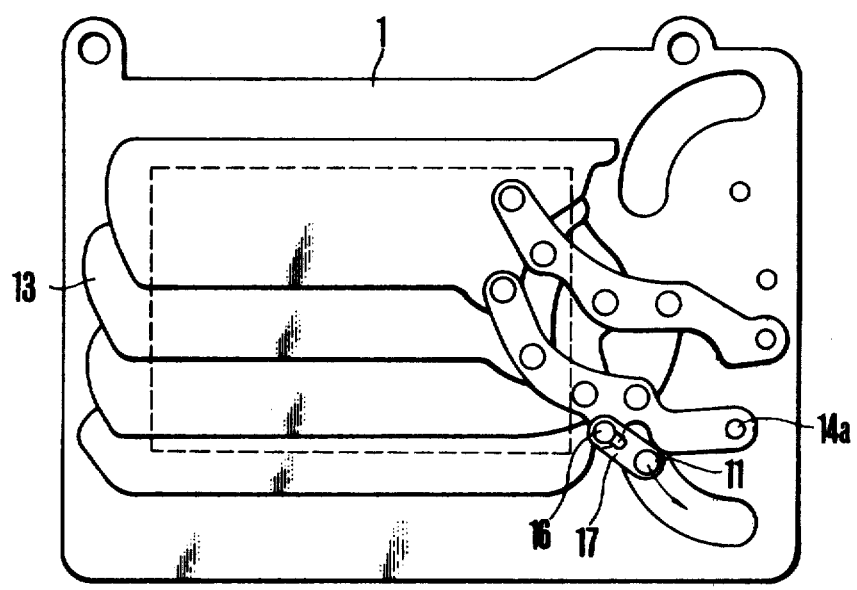

FIG. 3 and FIG. 4 show another embodiment wherein instead of providing the arm 14 with an elongated slot, the connecting plate 17 is arranged so as to be movable. In this embodiment the connecting plate 17 arranged so as to be rotatable around the driving pin 11 is provided with a slot 17a, in which the shaft 16 provided on the arm 14 is inserted so as to be slidable and rotatable. When the driving pin 11 starts to run before the shutter release in the direction of the arrow shown in FIG. 3, the connecting plate 17 immediately follows this motion but does not transmit the motion to the pin 16, whereby when the end of the slot 17a engaged with the shaft 16 as is shown in FIG. 4 after the driving pin has run a certain determined distance, the motion is transmitted to the arm 14 so as to let the shutter blade start to run.

Figure 5:
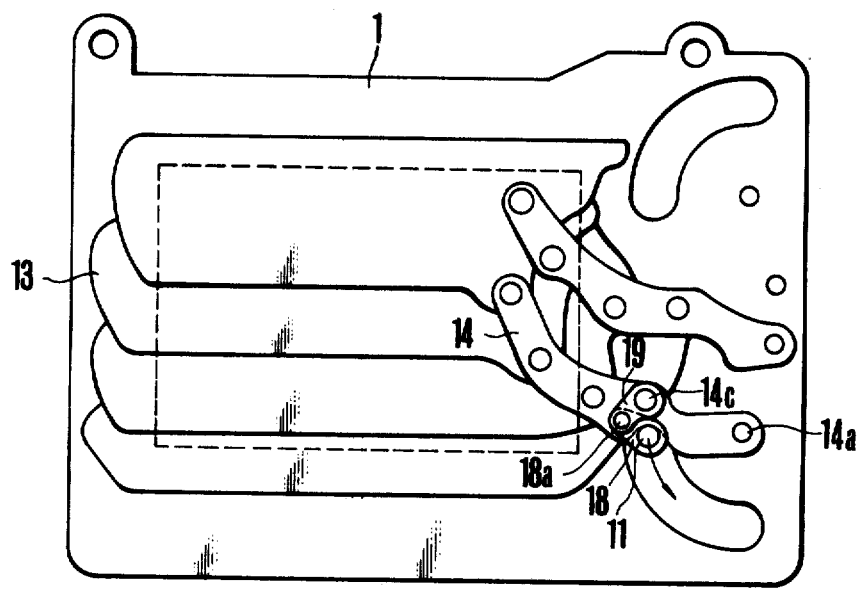
FIGS. 5 and 6 are plan views showing a third embodiment in different operating positions.
Figure 6:
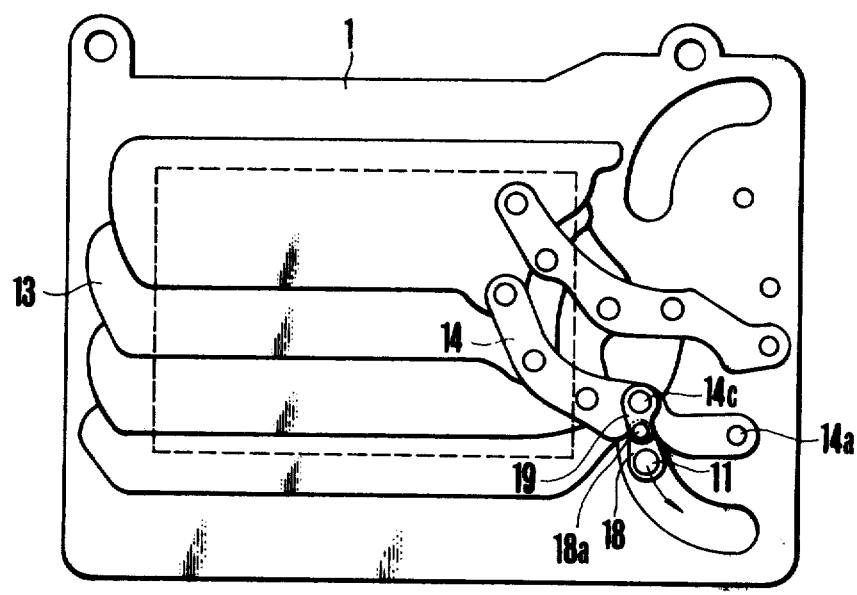

FIGS. 5 and 6 show a further embodiment wherein the driving pin 11 is connected to the arm 14 with two levers. A lever 18 has the driving pin rotatably inserted in one end thereof and a lever 19 has one end linked with the arm 14 at 14c, whereby the other end of the lever 18 and that of lever 19 are connected to each other with a pin 18a so as to be rotatable against each other. In the state before shutter release shown in FIG. 5 the pin 11 assumes a position nearest to 14c, whereby when the driving pin 11 is displaced along the direction of the arrow after the current has been supplied to the coil 7 for the leading shutter blade, the lever 18 follows the motion, rotating around the pin 11, while the lever 19 rotates around the shaft 14c until the pins 11, 18a and 14c are in alignment as is shown in FIG. 6. The driving force is then transmitted to the actuating arm 14 to cause the leading shutter blade to start to run.

As explained above in detail in case of the present invention play is provided between the electromagnetic driving source and the actuating member which receives the driving force from the driving source for actuating the shutter blade in such a manner that the driving source is allowed to run a certain determined distance almost with no load so as to improve the starting characteristics of the shutter blade with the moment of inertia. In this way the power consumption is decreased, while a compact and effective electromagnetically driven shutter can be obtained.

While specific embodiments of the invention have been shown and described in detail to illustrate the application of the inventive principles, it will be understood that the invention may be embodied otherwise without departing from such principles.

What is claimed is:

1. An electromagnetically driven shutter comprising: electromagnetic driving source means;
means for supplying current to said electromagnetic driving source means;
a plurality of shutter blades;
actuating means connected with said shutter blades and receiving the driving force from said electromagnetic driving source means so as to drive the shutter blades for exposure; and
connecting means for connecting said actuating means to said electromagnetic driving source means;
said connecting means being arranged so as to start to move with inception of the current supply to said electromagnetic driving source means and to transmit the driving force thereof to said actuating means with delay after having run a certain determined distance.

2. An electromagnetically driven shutter comprising:
electromagnetic driving source means adapted to be actuated by a current supply;
means for supplying current to said electromagnetic driving source means;
a plurality of shutter blades;
actuating means connected with said shutter blades and adapted to rotate upon receipt of a driving force from said electromagnetic driving source means so as to drive said shutter blades for exposure; and
connecting means provided on said electromagnetic driving source means so as to transmit said driving force to said actuating means after said electromagnetic driving source means has rotated through a certain determined angle.

3. An electromagnetically driven shutter in accordance with claim 2, wherein said connecting means comprise projections engaging in slots provided in said actuating means.

4. An electromagnetically driven shutter in accordance with claim 2, wherein said connecting means comprise first projections secured on said electromagnetic driving source means, levers rotatably engaged with said first projections and second projections provided on said actuating means, said second projections engaging in slots provided in said levers.

5. An electromagnetically driven shutter in accordance with claim 2, wherein said connecting means consist of two levers which are connected at one end so as to be rotatable against each other and supported between said electromagnetic driving source means and said actuating means.

* * * * *